(12) United States Patent
Araki

(10) Patent No.: US 11,271,977 B2
(45) Date of Patent: Mar. 8, 2022

(54) INFORMATION PROCESSING APPARATUS, INFORMATION PROCESSING SYSTEM, INFORMATION PROCESSING METHOD, AND NON-TRANSITORY RECORDING MEDIUM

(71) Applicant: Shigeo Araki, Kanagawa (JP)

(72) Inventor: Shigeo Araki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/856,266

(22) Filed: Apr. 23, 2020

(65) Prior Publication Data
US 2020/0382567 A1 Dec. 3, 2020

(30) Foreign Application Priority Data

May 28, 2019 (JP) .............................. JP2019-099748

(51) Int. Cl.
*H04L 29/06* (2006.01)
*H04L 65/401* (2022.01)
(Continued)

(52) U.S. Cl.
CPC ........ *H04L 65/4015* (2013.01); *G06F 3/0481* (2013.01); *G06F 3/1454* (2013.01);
(Continued)

(58) Field of Classification Search
CPC ............. H04L 65/4015; H04L 12/1881; H04L 67/303; H04L 65/1069; H04L 12/18; H04L 65/4007; H04L 12/1813; H04L 12/1818; H04L 65/403; G06F 3/1454; G06F 3/0481; G09B 5/00; G09B 7/00; G06Q 10/10; H04M 3/567; H04M 3/563; H04M 3/564;
(Continued)

(56) References Cited

U.S. PATENT DOCUMENTS 8,325,895 B2 * 12/2012 Nishide ................. H04M 3/382
379/202.01
2005/0271293 A1 * 12/2005 Ying ....................... G06T 5/005
382/254

(Continued)

FOREIGN PATENT DOCUMENTS

JP  2018-101368  6/2018

OTHER PUBLICATIONS

Telus ("WebEx-User Guide Cloud Connected Audio Service Meeting Centre Version 0.9", Telus Business, Feb. 19, 2018, retrieved from https://assets.ctfassets.net/1zi7brhrgm30/1v8MBy17gswG6mu0qeqyoM/ce2128f82392f0fdf232038f15b26281/WebEx_UserGuide_FINAL.PDF on Dec. 31, 2020, hereinafter NPLTel). (Year: 2018).*

(Continued)

*Primary Examiner* — Michael A Keller
(74) *Attorney, Agent, or Firm* — IPUSA, PLLC

(57) ABSTRACT

An information processing apparatus, an information processing system, an information processing method and a non-transitory recording medium. The information processing apparatus detects one or more users using the information processing apparatus and notifies each user of remote service connection destination information required for connecting to a remote service using notification destination information for sending notification to the user associated with each detected user.

10 Claims, 20 Drawing Sheets

(51) Int. Cl.

| | |
|---|---|
| *H04L 12/18* | (2006.01) |
| *H04L 65/403* | (2022.01) |
| *H04L 67/303* | (2022.01) |
| *H04L 65/1069* | (2022.01) |
| *H04M 3/56* | (2006.01) |
| *H04N 7/15* | (2006.01) |
| *G06F 3/14* | (2006.01) |
| *G09B 5/00* | (2006.01) |
| *G06Q 10/10* | (2012.01) |
| *G09B 7/00* | (2006.01) |
| *G06F 3/0481* | (2022.01) |

(52) U.S. Cl.
CPC ............... *G06Q 10/10* (2013.01); *G09B 5/00* (2013.01); *G09B 7/00* (2013.01); *H04L 12/18* (2013.01); *H04L 12/1813* (2013.01); *H04L 12/1818* (2013.01); *H04L 12/1881* (2013.01); *H04L 65/1069* (2013.01); *H04L 65/403* (2013.01); *H04L 65/4007* (2013.01); *H04L 67/303* (2013.01); *H04M 3/56* (2013.01); *H04M 3/562* (2013.01); *H04M 3/563* (2013.01); *H04M 3/564* (2013.01); *H04M 3/565* (2013.01); *H04M 3/567* (2013.01); *H04N 7/15* (2013.01)

(58) Field of Classification Search
CPC ........ H04M 3/565; H04M 3/562; H04M 3/56; H04N 7/15
See application file for complete search history.

(56) References Cited

U.S. PATENT DOCUMENTS

| | | | |
|---|---|---|---|
| 2006/0085271 A1* | 4/2006 | Tokita | G06Q 20/123 705/26.8 |
| 2007/0222747 A1* | 9/2007 | Kritt | H04L 12/1827 345/156 |
| 2014/0164080 A1* | 6/2014 | Thompson, Jr. | G06Q 30/02 705/14.16 |
| 2015/0052183 A1* | 2/2015 | Inomata | H04L 67/10 709/201 |
| 2016/0373542 A1* | 12/2016 | Baba | H04L 67/2838 |
| 2017/0078149 A1* | 3/2017 | Utoh | H04L 67/1097 |
| 2017/0178225 A1* | 6/2017 | Suzuki | G06Q 10/10 |
| 2018/0013764 A1* | 1/2018 | Morrison | H04W 4/08 |
| 2018/0067700 A1 | 3/2018 | Araki | |
| 2019/0020770 A1 | 1/2019 | Araki | |
| 2019/0129669 A1 | 5/2019 | Takahashi et al. | |
| 2019/0235735 A1 | 8/2019 | Toyota et al. | |
| 2019/0384536 A1 | 12/2019 | Araki | |
| 2020/0177645 A1* | 6/2020 | Yoshida | G06Q 10/1095 |

OTHER PUBLICATIONS

Telus ("WebEx-User Guide Cloud Connected Audio Service Meeting Centre Version 0.9", Telus Business, Feb. 19, 2018, retrieved from https://assets.ctfassets.net/1zi7brhrgm30/1v8MBy17gswG6mu0qeqyoM/ce2128f82392f0fdf232038f15b26281/WebEx_UserGuide_FINAL.PDF on Dec. 31, 2020) (Year: 2018).*

* cited by examiner

FIG. 5

| USER ID | NAME | MAIL ADDRESS |
|---------|------|--------------|
| office1 | Mary | office1@office.example.com |
| office2 | Sato | office2@office.example.com |
| office3 | Saito | office3@office.example.com |
| ... | ... | ... |

FIG. 6

| SCHEDULE ID | SCHEDULE NAME | SCHEDULE TYPE | OWNER | START TIME AND PERIOD | INVITEE | REMOTE SERVICE CONNECTION DESTINATION INFORMATION |
|---|---|---|---|---|---|---|
| sch-1 | Demonstration Material Preparation | Meeting | office1 | Nov.12, 2018 12:00-13:00 | office1 (Mary), office4 (Suzuki), office5 (Itoh) | https://remoteserviceb.com/room/marysroom |
| sch-2 | Launch Plan | Meeting | office1 | Nov.12, 2018 15:00-15:30 | office1 (Mary), office2 (Sato), office3 (Saito) | https://remoteservicea.com/meetingroom/134565 |

FIG. 7

| USER ID | NAME | MAIL ADDRESS | NOTIFICATION KEY | EXTERNAL SERVICE SETTING ID | IDENTIFICATION INFORMATION |
|---|---|---|---|---|---|
| user001 | Mary Smith | mary@intra.example.com | wnIOmdn | connect1a | ICCARD-123 |
| user002 | Sato Ayumu | sato@intra.example.com | OalhOIkk | connect2a | ICCARD-248 |
| user003 | Saito Ichiro | saito@intra.example.com | NiLLooFh | connect3a | ICCARD-255 |
| ... | | | | | ... |

FIG. 8

| EXTERNAL SERVICE SETTING ID | USER ID | ADDRESS INFORMATION | USER ID FOR EXTERNAL SERVICE | AUTHENTICATION TOKEN FOR EXTERNAL SERVICE |
|---|---|---|---|---|
| connect1a | user001 | office.example.com | office1 | eyJhbGc11··· |
| connect2a | user002 | office.example.com | office2 | eyJhbGc12··· |
| connect3a | user003 | office.example.com | office3 | eyJhbGc13··· |
| ... | ... | ... | ... | ... |

FIG. 9

| USER ID | ORGANIZER |
|---|---|
| user001 | Yes |
| user002 | No |
| user003 | No |

From: mary@intra.example.com

Remote meeting is started.

Remote meeting is started.
Connect and join the meeting.

○ How to connect to the remote meeting.
  Open https://remoteservicea.com/meetingroom/134565 in a browser.

○ How to project your screen to electronic whiteboard after starting
  the meeting with your terminal.

1. Connect by HDMI Cable

2. Connect by Browser: Access http://192.168.0.5

FIG. 20

Remote meeting is started.

○ How to connect to the remote meeting.
  Open https://remoteservicea.com/meetingroom/134565 in a browser.

○ How to project your screen to electronic whiteboard after starting
  the meeting with your terminal.

1. Connect by HDMI Cable

2. Connect by Browser: Access http://192.168.0.5

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2019-099748, filed on May 28, 2019 in the Japan Patent Office, the entire disclosure of which is hereby incorporated by reference herein.

BACKGROUND

Technical Field

The present disclosure relates to an information processing apparatus, an information processing system, an information processing method and a non-transitory recording medium storing a plurality of instructions which, when executed by one or more processors, causes the processors to perform the information processing method.

Background Art

A remote meeting system that connects a plurality of sites to implement a remote cooperative operation is known. In the conventional remote meeting system, a graphical user interface screen displaying a base system performing a remote meeting with a related theme is created in response to a request from a base system so that it is possible to understand what the remote meeting being held at each base or between bases is about.

SUMMARY

Embodiments of the present disclosure describe an information processing apparatus, an information processing system, an information processing method and a non-transitory recording medium. The information processing apparatus detects one or more users using the information processing apparatus and notifies each user of remote service connection destination information required for connecting to a remote service using notification destination information for sending notification to the user associated with each detected user.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is a diagram illustrating account information;

FIG. 6 is a diagram illustrating schedule information;

FIG. 7 is a diagram illustrating user information;

FIG. 8 is a diagram illustrating external service settings information;

FIG. 9 is a diagram illustrating participant management information;

FIG. 19 is a diagram illustrating an example of a notification mail; and

FIG. 20 is a diagram illustrating an example of the notification pushed to a browser.

Figure 1:
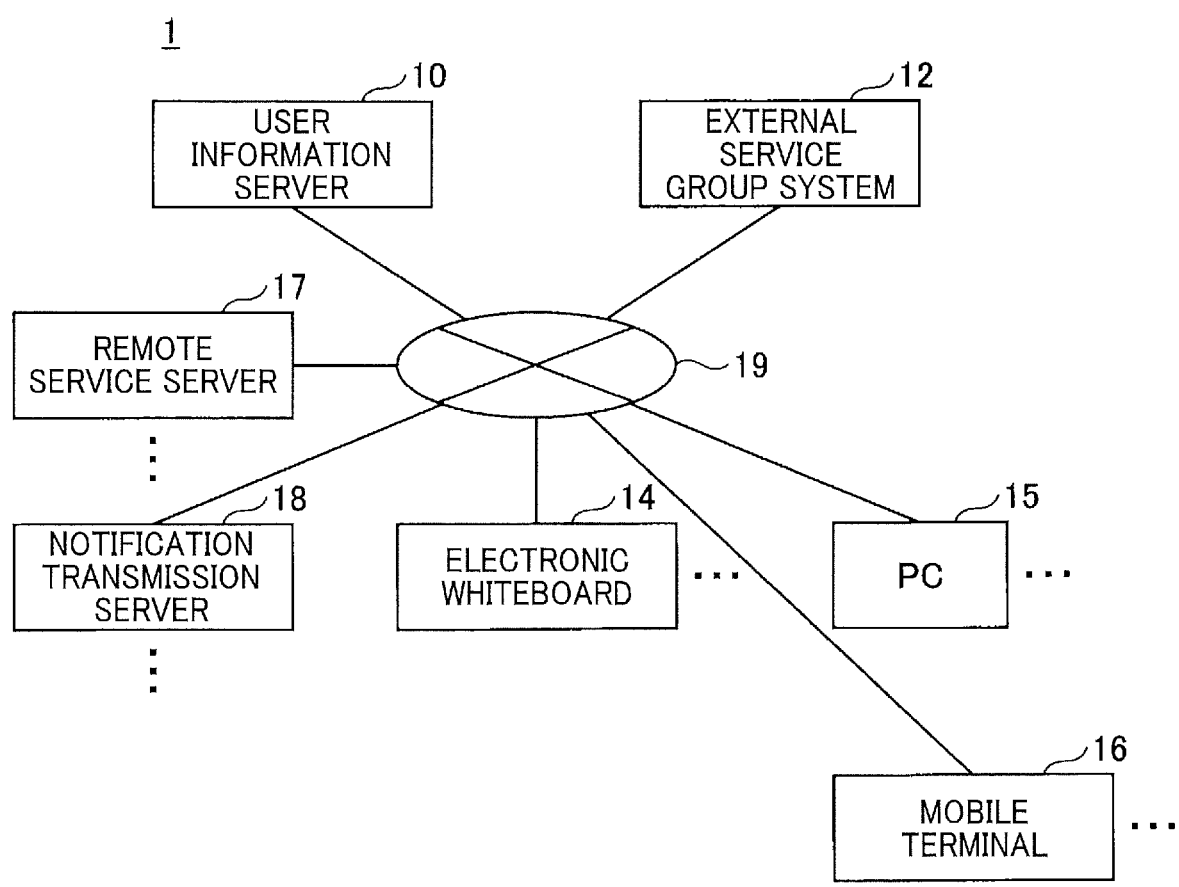
FIG. 1 is a schematic diagram illustrating an example of a configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, a description is given of several embodiments of the present disclosure with reference to the drawings. In the present embodiment, an example of a remote meeting using an electronic whiteboard is described. However, the present embodiment is not limited to a meeting. The present embodiment can be applied to various situations in which remote connection such as screen sharing is performed by connecting a plurality of devices such as another electronic whiteboard, personal computer (PC), smart device, and the like, to a shared destination.

FIG. 1 is a schematic diagram illustrating an example of a configuration of an information processing system according to the present embodiment. The information processing system 1 illustrated in FIG. 1 includes a user information server 10, an external service group system 12, one or more electronic whiteboards 14, one or more personal computers (PCs) 15, one or more mobile terminals 16, one or more remote service servers 17 and one or more notification transmission servers 18, all communicably connected through a network 19 such as the internet or a local area network (LAN).

The user information server 10 and the electronic whiteboard 14 implement an electronic whiteboard system. The electronic whiteboard system provides functions related to the electronic whiteboard 14 by operating in cooperation with the external service group system 12 outside the electronic whiteboard system. The electronic whiteboard system operates in cooperation with a remote service server 17 outside the electronic whiteboard system to provide a function related to a remote meeting. The remote meeting is a meeting such as a web meeting, for example, in which video and audio are exchanged and materials are shared using the electronic whiteboard 14, the PC 15, and the mobile terminal 16 that can be connected to the network 19. The remote meeting may be called remote connection or remote service. Further, the electronic whiteboard system operates in cooperation with the notification transmission server 18 outside the electronic whiteboard system to notify a user designated as a notification target described below.

The external service group provided by the external service group system 12 indicates an integrated service such as Office 365 (registered trademark) including a user service, a storage service, a mail service, a schedule service (calendar service), and the like. The external service group is provided so that services such as a user service, a storage service, a mail service, and a schedule service can be used with the same user account. The external service group provided by the external service group system 12 is also called groupware, and each service belonging to the same external service group can be used with the same authentication information (combination of identifier (ID) and password, access token, etc.). The external service groups may be different for each user and may be one or more. The external service group system 12 is implemented by one or more computers.

The user information server 10 stores a user information list, external service settings information, and the like, which are described below, and is used by the external service group system 12 or the electronic whiteboard 14. The user information server 10 may be shared by a plurality of electronic whiteboard 14 and may not be on the same network segment. Further, the user information server 10 may be included in the electronic whiteboard 14. The user information server 10 is implemented by one or more computers.

The electronic whiteboard 14 is used in a remote meeting in which a plurality of users participate. The electronic whiteboard 14 displays an image drawn by, for example, an electronic pen or by hand. The electronic whiteboard 14 can also display an image of an electronic file read from a USB memory, a PC connected via a cable, or the external service group system 12, or the like. Further, the electronic whiteboard 14 can display an image captured by a camera.

The electronic whiteboard 14 can participate in a remote meeting by connecting to a remote meeting connection destination. The electronic whiteboard 14 can remotely share image data and audio data with a plurality of devices participating in the remote meeting such as other electronic whiteboard, the PC 15 and the mobile terminal 16. Note that the electronic whiteboard 14 is an example, and any device having a remote sharing function, such as a terminal of a remote meeting system, a display, and a projector may operate in the same way. The electronic whiteboard 14 is an example of a shared terminal shared and used by a plurality of users.

The PC 15 and the mobile terminal 16 are examples of a personal terminal and are examples of the device that can participate in a remote meeting by connecting to a connection destination of the remote meeting. Personal terminals that can participate in the remote meeting include smart devices such as smartphones and tablet terminals in addition to PCs.

The remote service server 17 provides a remote meeting service. The remote meeting service enables a remote meeting to be held by remotely sharing image data and audio data between devices connected to a connection destination of the remote meeting. For example, the remote service server 17 causes a device such as the electronic whiteboard 14, the PC 15, and the mobile terminal 16 connected to the same remote meeting connection destination to hold a remote meeting.

The notification transmission server 18 sends a notification to a user identified as a notification target described below, in accordance with a request from the electronic whiteboard 14. The notification transmission server 18 is implemented by, for example, a mail server or a push notification server of a web browser.

The configuration of the information processing system 1 illustrated in FIG. 1 is an example. For example, at least some of the functions of the user information server 10, the external service group system 12, the remote service server 17, or the notification transmission server 18 may be provided in the electronic whiteboard 14. The information processing system 1 may perform at least some of the functions of the user information server 10, the external service group system 12, the electronic whiteboard 14, the remote service server 17, or the notification transmission server 18 by an information processing apparatus other than the user information server 10, the external service group system 12, the electronic whiteboard 14, the remote service server 17, and the notification transmission server 18.

Figure 2:
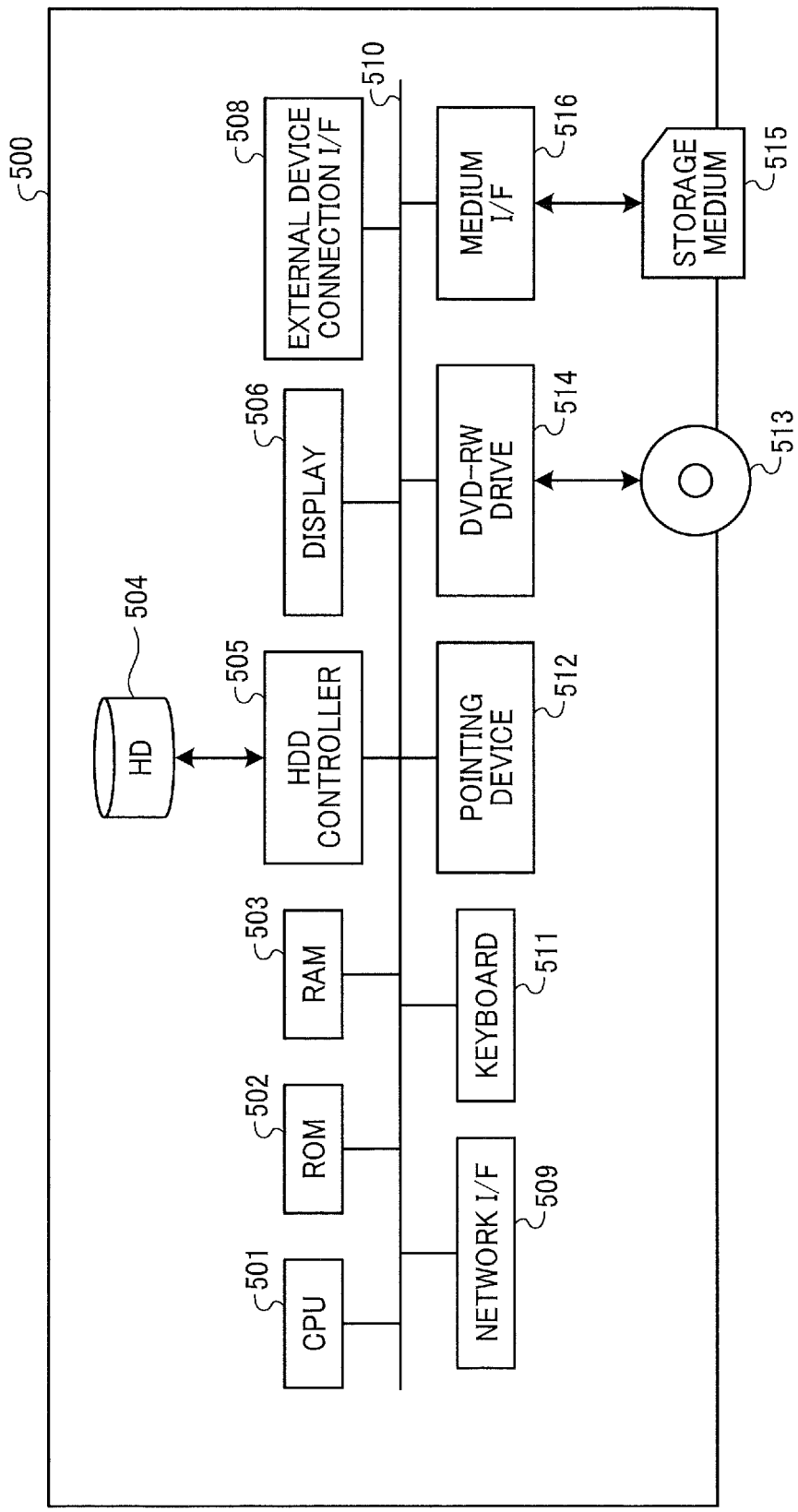
FIG. 2 is a block diagram illustrating an example of a hardware configuration of a computer, according to embodiments of the present disclosure.

The user information server 10, the external service group system 12, the PC 15, the mobile terminal 16, the remote service server 17, and the notification transmission server 18 illustrated in FIG. 1 are implemented by, for example, a computer 500 having a hardware configuration as illustrated in FIG. 2. FIG. 2 is a block diagram illustrating an example of hardware configuration of a computer, according to the present embodiment.

As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, and a display 506, an external device connection interface (I/F) 508, a network I/F 509, a data bus 510, a keyboard 511, a pointing device 512, a digital versatile disk rewritable (DVD-RW) drive 514, and a medium I/F 516.

Among these elements, the CPU 501 controls the overall operation of the computer 500 according to the program. The ROM 502 stores a program such as an initial program loader (IPL) used for driving the CPU 501. The RAM 503 is used as a work area for the CPU 501. The HD 504 stores various data such as a control program. The HDD controller 505 controls reading and writing of various data from and to the HD 504 under control of the CPU 501.

The display 506 displays various information such as a cursor, menu, window, character, or image. The external device connection I/F 508 is an interface for connecting various external devices. The external device in this case is, for example, a USB memory or a printer. The network I/F 509 is an interface for performing data communication using the network 19. The data bus 510 is an address bus, a data bus, or the like for electrically connecting each element such as the CPU 501.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to the storage medium 515 such as a flash memory.

Figure 3:
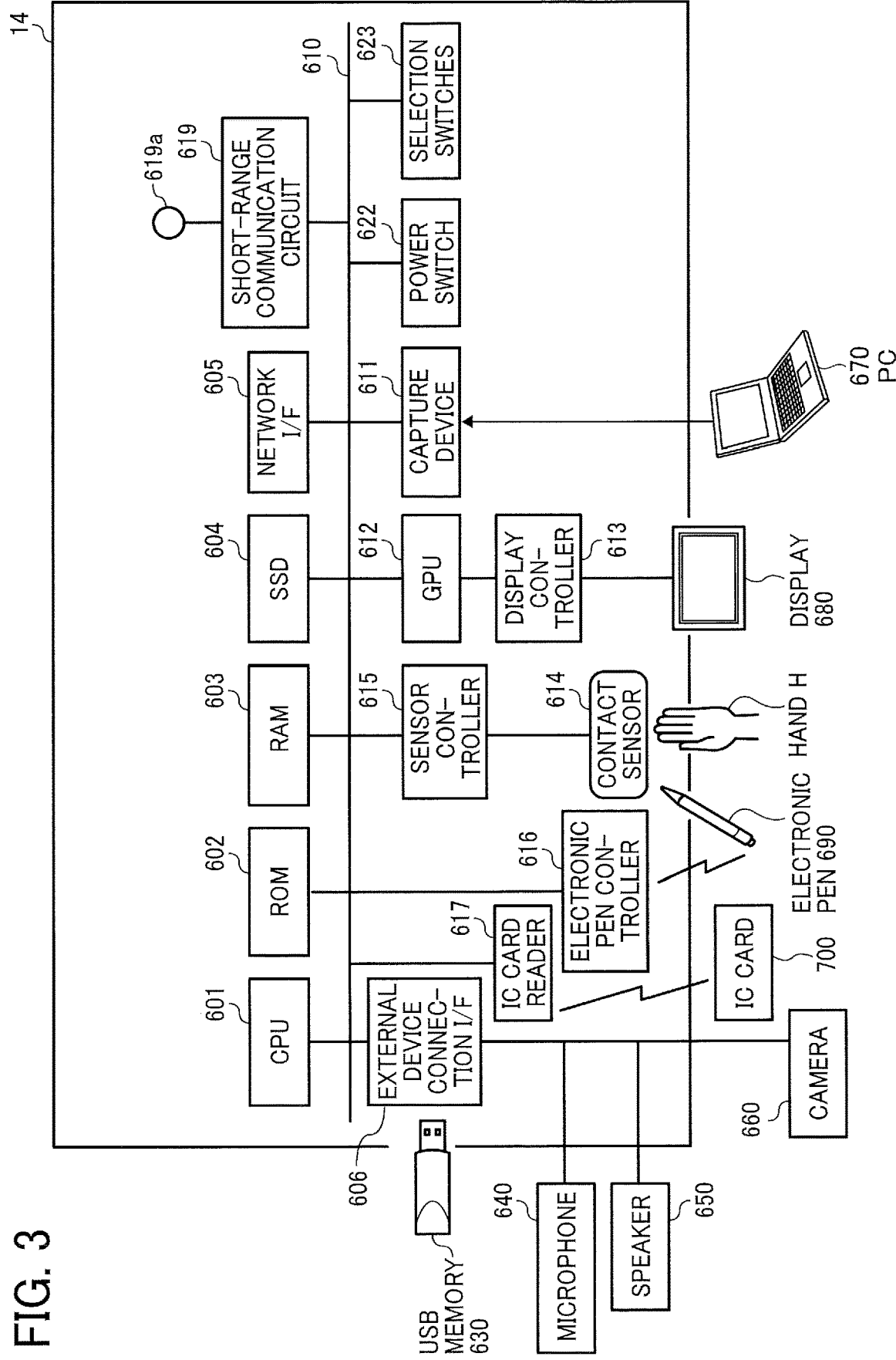
FIG. 3 is a block diagram illustrating an example of a hardware configuration of an electronic whiteboard, according to embodiments of the present disclosure.

FIG. 3 is a block diagram illustrating an example of a hardware configuration of an electronic whiteboard according to the present embodiment. As illustrated in FIG. 3, the electronic whiteboard 14 includes a CPU 601, a ROM 202, a RAM 603, a solid state drive (SSD) 604, a network I/F 605, and an external device connection I/F 606.

Among these elements, the CPU 601 controls the overall operation of the electronic whiteboard 14 according to the program. The ROM 602 stores programs used for driving the CPU 601 such as the IPL. The RAM 603 is used as a work area for the CPU 601. The SSD 604 stores various data such as a program for the electronic whiteboard 14.

The network I/F 605 controls communication with the network 19. The external device connection I/F 606 is an interface for connecting various external devices. The external devices in this case are, for example, the universal serial bus (USB) memory 630 and external devices (a microphone 640, a speaker 650, and a camera 660).

Further, the electronic whiteboard 14 includes a capture device 611, a graphics processing unit (GPU) 612, a display controller 613, a contact sensor 614, a sensor controller 615, an electronic pen controller 616, an integrated circuit (IC) card reader 617, a short-range communication circuit 619, an antenna 619a for the short-range communication circuit 619, a power switch 622 and selection switches 623.

The capture device 611 causes the display of the external PC 670 to display video data as a still image or a moving image. The GPU 612 is a semiconductor chip dedicated to processing a graphical image. The display controller 613 controls and manages screen display so as to output an image from the GPU 612 to the display 680 or the like.

The contact sensor 614 detects contact with the display 680 by an electronic pen (stylus pen) 690 or a user's hand H. The sensor controller 615 controls processing of the contact sensor 614. The contact sensor 614 performs input of coordinates and detection of coordinates by an infrared cutoff method. The light-receiving elements emit a plurality of infrared rays parallel to a surface of the display 680. The light-receiving elements receive light passing in the direction that is the same as an optical path of the emitted infrared rays, which are reflected by the reflector frame. More specifically, the display 680 is provided with two light-receiving elements disposed on both upper side ends of the display 680, and a reflector frame surrounding the sides of the display 680.

The contact sensor 614 outputs, to the sensor controller 615, an identifier (ID) of the infrared ray that is blocked by an object (such as the user's hand) after being emitted from the light-receiving elements. Based on the ID of the infrared ray, the sensor controller 615 detects a specific coordinate that is touched by the object. The electronic pen controller 616 communicates with the electronic pen 690 to detect contact by the tip or bottom of the electronic pen 690 with the display 680.

The IC card reader 617 reads identification information unique to the IC card 700 from a radio frequency (RF) tag embedded in the IC card 700 by wireless communication. The IC card reader 617 may be included in the electronic whiteboard 14 or may be external to the electronic whiteboard 14. Note that the IC card 700 may be included in a smart device such as a smartphone. The electronic whiteboard 14 may use a device other than the IC card reader 617 as long as the device can acquire identification information capable of identifying the user, and may use a biometric authentication device (fingerprint, palm print, iris, face, etc.) or a barcode reading device, and the like.

The short-range communication circuit 619 is a communication circuit such as near field communication Near Field Communication (NFC) or Bluetooth (registered trademark). The power switch 622 controls power to the electronic whiteboard 14. The selection switches 623 are a group of switches for adjusting brightness, hue, etc., of display on the display 680, for example.

The electronic whiteboard 14 further includes a bus line 610. The bus line 610 is an address bus, a data bus, or the like for electrically connecting each component such as the CPU 601 illustrated in FIG. 3.

The contact sensor 614 is not limited to the infrared blocking system type described above and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object against the display. In addition to or as an alternative to detecting contact by the tip or bottom of the electronic pen 690, the electronic pen controller 616 may also detect contact by another part of the electronic pen 690, such as a part held by a hand of the user.

Figure 4:
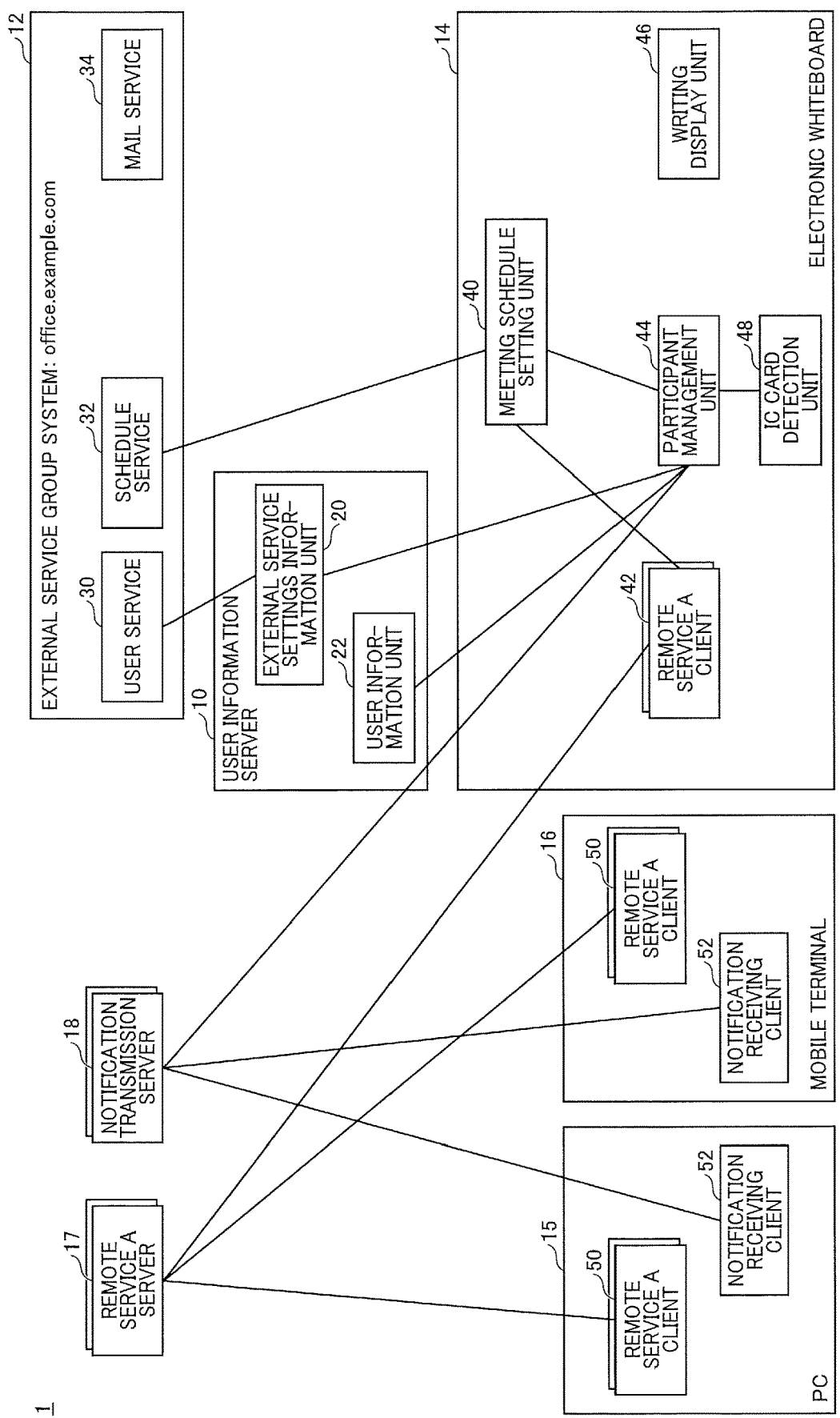
FIG. 4 is a block diagram illustrating an example of a functional configuration of the information processing system according to embodiments of the present disclosure.

The information processing system 1 according to the present embodiment is implemented, for example, by a functional configuration illustrated in FIG. 4. FIG. 4 is a block diagram illustrating an example of a functional configuration of the information processing system according to the present embodiment. The functional configuration in FIG. 4 omits components unnecessary for the description of the present embodiment as appropriate.

The information processing system 1 illustrated in FIG. 4 includes a user information server 10, an external service group system 12, an electronic whiteboard 14, a PC 15, a mobile terminal 16, a remote service A server 17, a notification transmission server 18. FIG. 4 illustrates an external service group system "office.example.com" as an example of the external service group system 12.

The external service group system 12 exemplifies a user service 30, a schedule service 32, and a mail service 34 as external service groups provided to the user. The user service 30 of the external service group system 12 stores, for example, account information as illustrated in FIG. 5. FIG. 5 illustrates an example of the account information. As illustrated in FIG. 5, the user service 30 of the external service group system 12 stores a user ID, a name, and a mail address as the account information.

The schedule service 32 stores, for example, schedule information as illustrated in FIG. 6. FIG. 6 illustrates an example of the schedule information. The schedule service 32 manages the user's action schedule and meeting schedule based on the schedule information of FIG. 6.

As illustrated in FIG. 6, the schedule service 32 stores schedule ID, schedule name, schedule type, owner, start time and period, invitee, and remote service connection destination information as the schedule information. The schedule ID is an example of schedule identification information. The schedule name is a name of a schedule. The schedule type is an example of information for distinguishing a schedule between a user's action schedule and a user's meeting schedule. The owner is an example of information for identifying a user who owns the scheduled information.

The start time and the period are an example of information indicating the date and time when the schedule starts and the period from the start to the end of the schedule and represents the start time and the end time of the schedule. The invitee is a user who is scheduled to participate in the scheduled event.

The remote service connection destination information indicates a connection destination of the remote meeting service and the remote meeting, and expressed by, for example, a uniform resource locator (URL) of Hypertext Transfer Protocol Secure (HTTPS) or a unique format ID. In the remote service connection destination information "https://remoteservicea.com/meetingroom/134565" illustrated in the schedule information in FIG. 6, the domain part "remoteservicea.com" indicates the remote meeting service, and the numeral string part "134565" indicates connection destination. When the electronic whiteboard 14 is connected to the connection destination "134565" of the remote meeting service "remoteservicea.com", the PC 15 and the mobile terminal 16 can connect to the connection destination "134565" of the same remote meeting service "remoteservicea.com", and hold a remote meeting with the devices connected to the connection destination of the remote meeting.

In the remote service connection destination information "https://remoteserviceb.com/room/marysroom" illustrated in the schedule information in FIG. 6, the domain part "remoteserviceb.com" indicates the remote meeting service, and the character string "marysroom" indicates the connection destination.

The mail service 34 manages a mail address for each user in the external service group system 12 and provides a mail function to the user. The mail service 34 stores an electronic mail addressed to a user's mail address in the external service group system 12.

The user information server 10 includes an external service settings information unit 20 and a user information unit 22. The user information unit 22 stores, for example, a user information list illustrated in FIG. 7. FIG. 7 illustrates an example of the user information list. As illustrated in FIG. 7, the user information list stores a user ID, a name, a mail address, a notification key, an external service setting ID, and identification information. Note that the mail address and the notification key are examples of notification destination information necessary for sending notification to the user.

The mail address is different from the mail address in FIG. 5, and for example, a mail address used in an intra network. The notification key is a key necessary for a push communication server to determine a notification destination to notify a user when the notification transmission server 18 is the push communication server. The external service setting ID is information for identifying external service settings information described below. The identification information is, for example, identification information unique to the IC card 700. According to the user information list of FIG. 7, the user ID and the external service settings information can be identified from the identification information read from the user's IC card 700.

FIG. 7 illustrates an example in which the notification keys of all the users are registered. The notification keys need to be registered in the following procedure. The user registers with the notification transmission server 18 from the web browser of the personal terminal such as the PC 15 or the mobile terminal 16. The notification transmission server 18 issues the notification key. The web browser of the personal terminal such as the PC 15 or the mobile terminal 16 registers the issued notification key in the user information list illustrated in FIG. 7.

When notification using the notification key is requested, the notification transmission server 18 can notify the web browser of the personal terminal such as the PC 15 or the mobile terminal 16 corresponding to the notification key by push communication. Accordingly, by using the notification key registered in the user information list of FIG. 7, the electronic whiteboard 14 can notify the web browser of the personal terminal such as the PC 15 or the mobile terminal 16 corresponding to the notification key.

The external service settings information unit 20 stores, for example, external service settings information as illustrated in FIG. 8. FIG. 8 illustrates an example of the external service settings information. The external service settings information illustrated in FIG. 8 is settings information that differs for each user for using the external service group system 12. The external service settings information stores an external service setting ID, a user ID, address information, a user ID of the external service, and an authentication token of the external service.

The address information and the user ID of the external service are examples of connection information to the external service group system 12. The authentication token of the external service is an example of authentication information of the external service group system 12.

The electronic whiteboard 14 includes a meeting schedule setting unit 40, a remote service A client 42, a participant management unit 44, a writing display unit 46, and an IC card detection unit 48. The IC card detection unit 48 reads the identification information from the detected IC card 700 of the user. The participant management unit 44 manages the participants of the remote meeting in a participant management information list as illustrated in FIG. 9, for example.

FIG. 9 illustrates an example of the participant management information list. The participant management information list stores a user ID of a user recognized as a participant of the remote meeting and information indicating whether the participant of the user ID is the organizer or not. For example, the participant management unit 44 identifies the user information from the user information list of FIG. 7 using the identification information read by the IC card detection unit 48 and stores the user ID of the identified user information as the user ID of the participant in the management information list.

The participant management information list in FIG. 9 illustrates an example in which the participant with the user ID "user001" is the organizer among the participants with the user IDs "user001", "user002", and "user003". The writing display unit 46 accepts the user's writing on the electronic whiteboard 14 and displays the contents of the writing.

The meeting schedule setting unit 40 has a user interface for setting a meeting schedule, communicates with the schedule service 32 to acquire the schedule information illustrated in FIG. 6. When the meeting schedule is set, the meeting schedule setting unit 40 acquires the participant management information list from the participant management unit 44 and displays a remote service connection confirmation screen described below.

The user can select a notification target described below from the users in the participant management information list on the remote service connection confirmation screen. When the notification target is selected, the meeting schedule setting unit 40 requests the participant management unit 44 to notify the notification target. The participant management unit 44 requests the notification transmission server 18 to notify the notification target. The remote service client 42 functions as a client for using the remote meeting service provided by the remote service server 17. The remote service client 42 is implemented by an application for using a remote meeting service, a web browser, or the like.

FIG. 4 illustrates the remote service client 50 and the notification receiving client 52 of the PC 15 and the mobile terminal 16. The remote service client 50 functions as a client for using the remote meeting service provided by the remote service server 17. The notification receiving client 52 functions as a client that receives a notification from the notification transmission server 18. The notification receiving client 52 is implemented by, for example, a mail application, a web browser, or the like.

In the present embodiment, the remote meeting service is connected using the remote service connection destination information included in the schedule information in FIG. 6, but remote service connection destination information stored outside of the schedule information illustrated in FIG. 6 may be used. For example, by including the remote service connection destination information in the user information list in FIG. 7 and preparing a button to connect to the remote meeting service using the remote service connection destination information included in the owner's user information, the remote meeting service can be connected without using the schedule information, after adding participants to the operation panel described below.

The configuration illustrated in FIG. 4 is an example, and alternatively other configurations may be used. For example, each unit of the electronic whiteboard 14 may be implemented by two devices, and each component other than the IC card detection unit 48 and the writing display unit 46 of the electronic whiteboard 14 may be implemented by a server. Further, without changing the device configuration, the user information server 10 may include components other than the IC card detection unit 48 and the writing display unit 46 of the electronic whiteboard 14, or a different device may have the user information unit 22 and the external service settings information unit 20 of the user information server 10. Further, the number of the remote service servers 17 is not limited to two and may be one or three or more servers. The number of remote meeting services is not limited to two but may be one or three or more. The configuration is not limited to one server for one remote meeting service, and one remote meeting service may be implemented by a plurality of servers.

Figure 10:
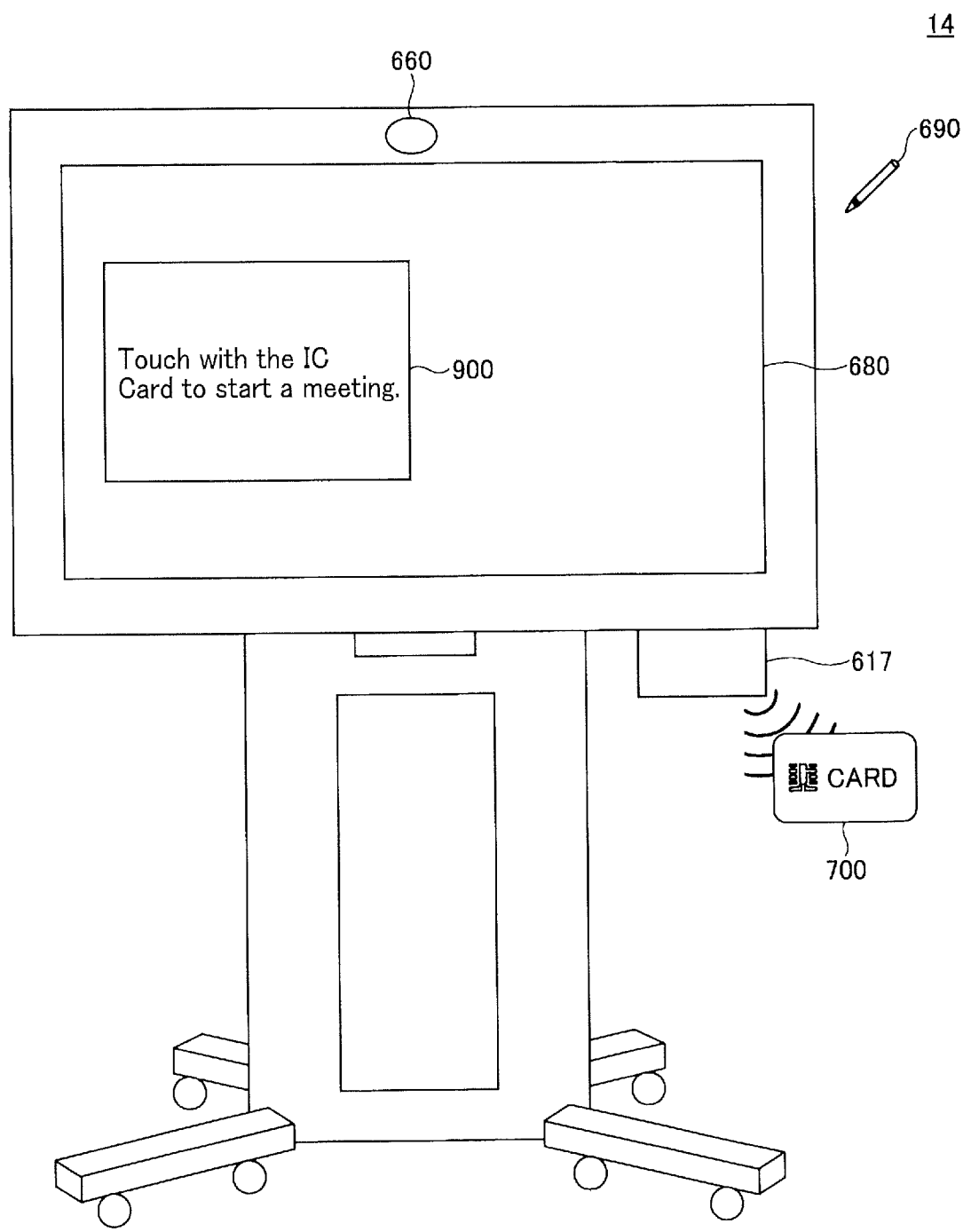
FIG. 10 is a diagram illustrating an external view of an electronic whiteboard according to embodiments of the present disclosure.

FIG. 10 is an illustration of an external view of an electronic whiteboard according to the present embodiment. As illustrated in FIG. 10, the electronic whiteboard 14 includes a display 680, a camera 660, and an IC card reader 617. The display 680 displays an operation panel 900 described below. The electronic whiteboard 14 according to the present embodiment has at least the following functions 1 to 5.

Function 1: Electronic Whiteboard Function: The electronic whiteboard 14 accepts writing on the display 680 with an electronic pen 690 or a finger. The electronic whiteboard 14 sends image data of writing on the display 680 by e-mail or stores the image data in a storage provided by a storage service of the external service group system 12. The electronic whiteboard 14 displays and accepts editing files such as meeting materials.

Function 2: Authentication Function: The electronic whiteboard 14 acquires authentication information and the like using the IC card reader 617, the camera 660, the biometric authentication device and the like, and performs user authentication based on the authentication information and the like. The electronic whiteboard 14 may perform user authentication by itself or may cause an external device to perform user authentication. The IC card reader 617 obtains authentication information such as identification information unique to the IC card 700 from the IC card 700 and authenticates the user by determining whether the authentication information matches by referring to the user information list in FIG. 7. The user may be authenticated by extracting a feature amount from a facial image captured by the camera 660 and determining whether the feature amount matches a feature amount registered in a user information list.

Function 3: External Service Cooperation Function: The electronic whiteboard 14 cooperates with the external service group system 12. For example, the electronic whiteboard 14 acquires the user's schedule information from the external service using the external service settings information of the user who has been authenticated by the authentication function and transmits information such as writing on the electronic whiteboard or a meeting material by e-mail to the invitee. Further, for example, the electronic whiteboard 14 accesses a storage provided by a storage service of the external service group system 12 of the user who has been authenticated, acquires a file, shares the file with another device, or transfers the file to other devices.

Function 4: Remote Sharing Function: The electronic whiteboard 14 shares and collaboratively edits the screen (remote execution of electronic whiteboard function) displayed on the electronic whiteboard 14 and shares an image or a video of a participant in the remote meeting captured by the camera 660, a sound of the microphone 640, or the like with a plurality of information processing apparatuses (other electronic whiteboards 14, the PC 15, the mobile terminal 16 and the like) installed at remote locations. Sharing screens refers to the use of multiple information processing apparatuses installed at remote locations to display (remote sharing) the same content on each information processing apparatuses and discuss the content in a remote meeting. Editing collaboratively refers to writing on the same screen from a plurality of information processing apparatuses, editing files, and the like.

Function 5: Other Functions: The electronic whiteboard 14 may include an application similar to an application operating on a general PC or smart device, such as a web browser or a mail application.

The functions described above are implemented by cooperation of hardware and software of the electronic whiteboard 14. The software includes a plurality of pieces of software of the electronic whiteboard 14 and the external device operating in cooperation.

Figure 11A:
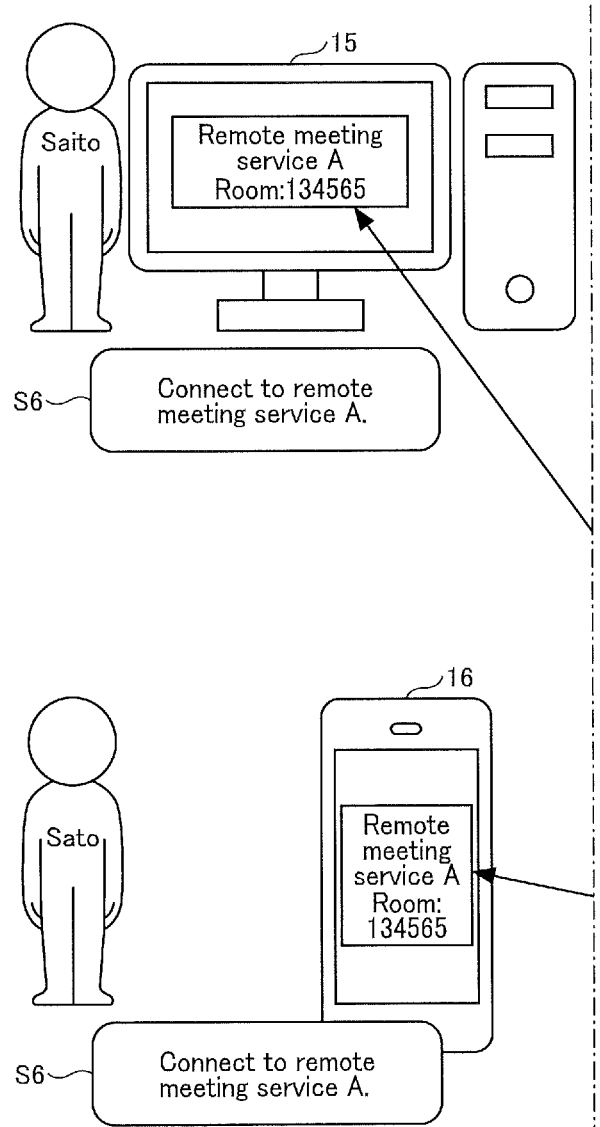
FIG. 11A and FIG. 11B are diagrams illustrating processing executed by the information processing system according to embodiments of the present disclosure.
Figure 11B:
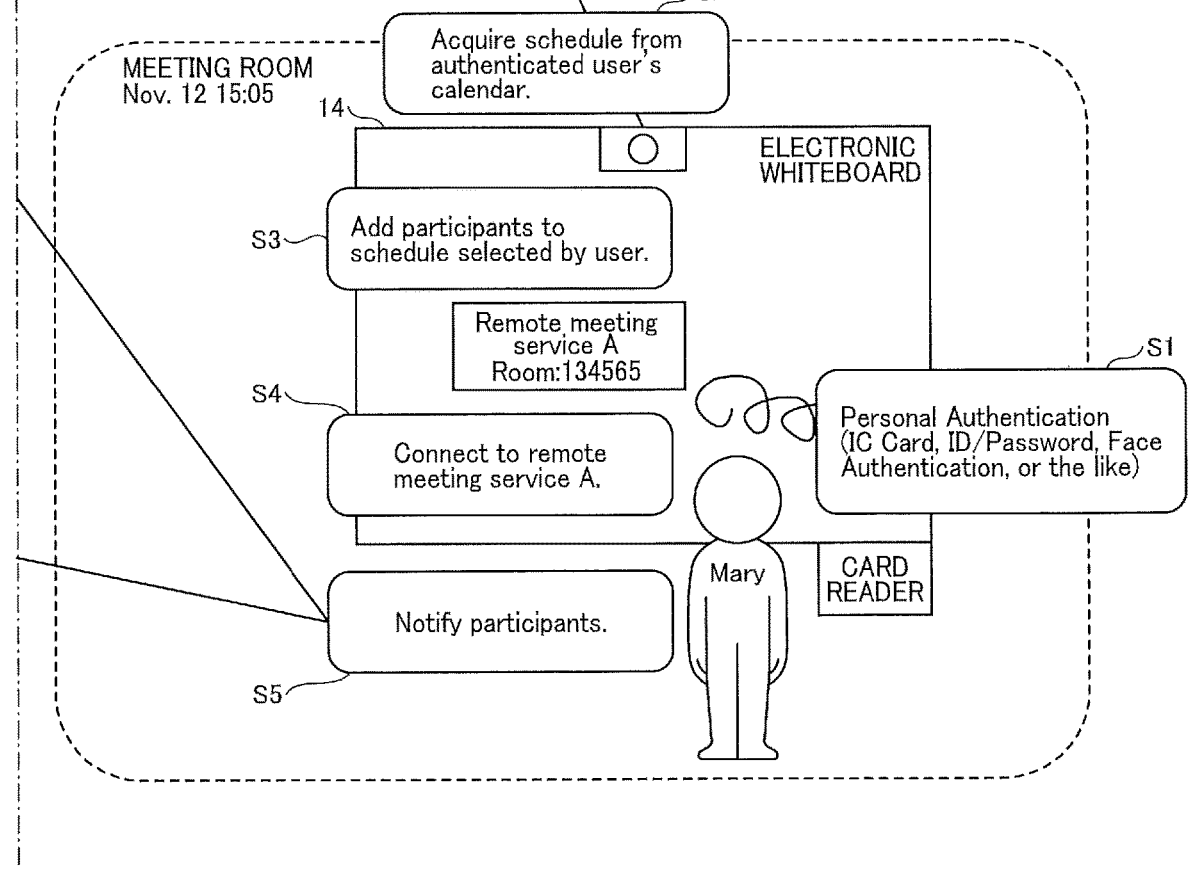

FIG. 11A and FIG. 11B are diagrams illustrating processing by the information processing system according to the present embodiment. In step S1, the participant of the remote meeting performs personal authentication on the electronic whiteboard 14. The personal authentication may be an authentication method performed by the participant voluntarily, such as IC card authentication or ID/password authentication or an authentication method such as face authentication, in which a participant is authenticated by being present. The personal authentication in step S1 can be performed for a plurality of participants, and the authenticated participant is added to the participant management information list in FIG. 9.

In step S2, the electronic whiteboard 14 acquires schedule information of the first authenticated user (for example, an organizer) from the schedule service 32. The schedule information includes the start time and period of the schedule, invitee, and remote service connection destination information. FIG. 11A and FIG. 11B illustrate an example of schedule information when different remote meeting services are being used.

In step S3, the electronic whiteboard 14 accepts the user to select a meeting schedule to be held from the meeting schedules included in the acquired schedule information. The electronic whiteboard 14 adds the invitee of the selected meeting to the participant management information list in FIG. 9. For example, the meeting schedule of the schedule information including the remote service connection destination information is selected as a remote meeting to be held.

In step S4, the electronic whiteboard 14 reads the remote service connection destination information from the schedule information of the meeting schedule selected as the remote meeting to be held and connects to the remote meeting service based on the remote service connection destination information to start a meeting. In step S5, the electronic whiteboard 14 sends a request to the notification transmission server 18, for sending a notification including remote service connection destination information of the remote meeting to be held, to the notification destination of the user identified as the notification target of the remote meeting to be started.

In response to the request from the electronic whiteboard 14, the notification transmission server 18 sends a notification including the remote service connection destination information of the remote meeting to be held to the notification destination of the user identified as the notification target of the remote meeting to be started. In step S6, the user who has received the notification including the remote service connection destination information of the remote meeting to be held uses the remote service connection destination information included in the notification and connect to the remote meeting service from the PC 15 or the mobile terminal 16 to participate in the remote meeting.

When holding a remote meeting using the electronic whiteboard 14, connecting to the remote meeting service by the user's personal terminal can be facilitated by sending notification including remote service connection destination information of the remote meeting to participants scheduled to participate in the remote meeting and participants who participated in the remote meeting with user authentication.

In addition, by sending a notification including the remote service connection destination information of a remote meeting to a participant scheduled to participate in the remote meeting, the participant can be reminded even if the participant has forgotten the remote meeting.

Figure 12A:
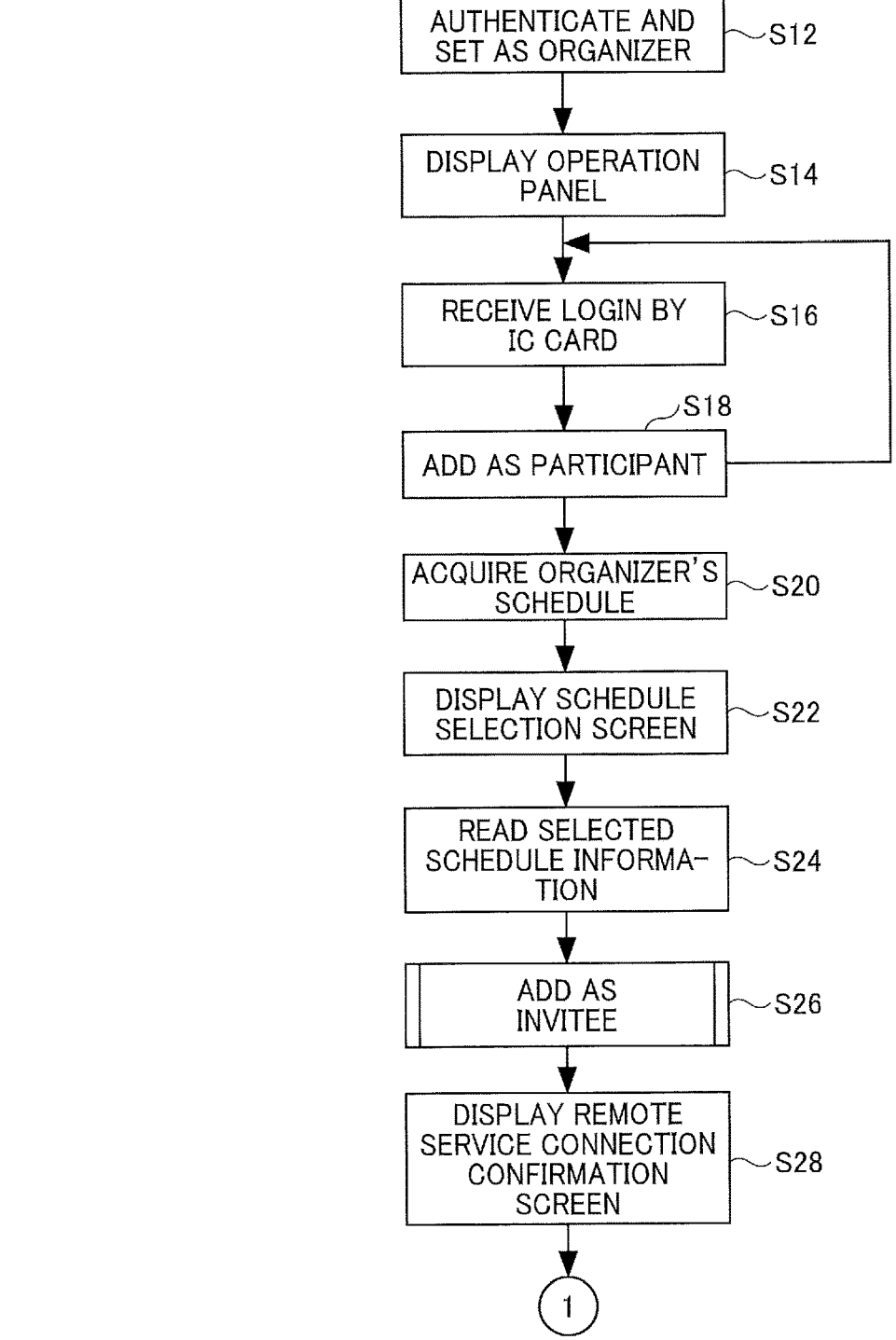
FIG. 12A and FIG. 12B are a flowchart illustrating an operation of a remote meeting using the electronic whiteboard.
Figure 12B:
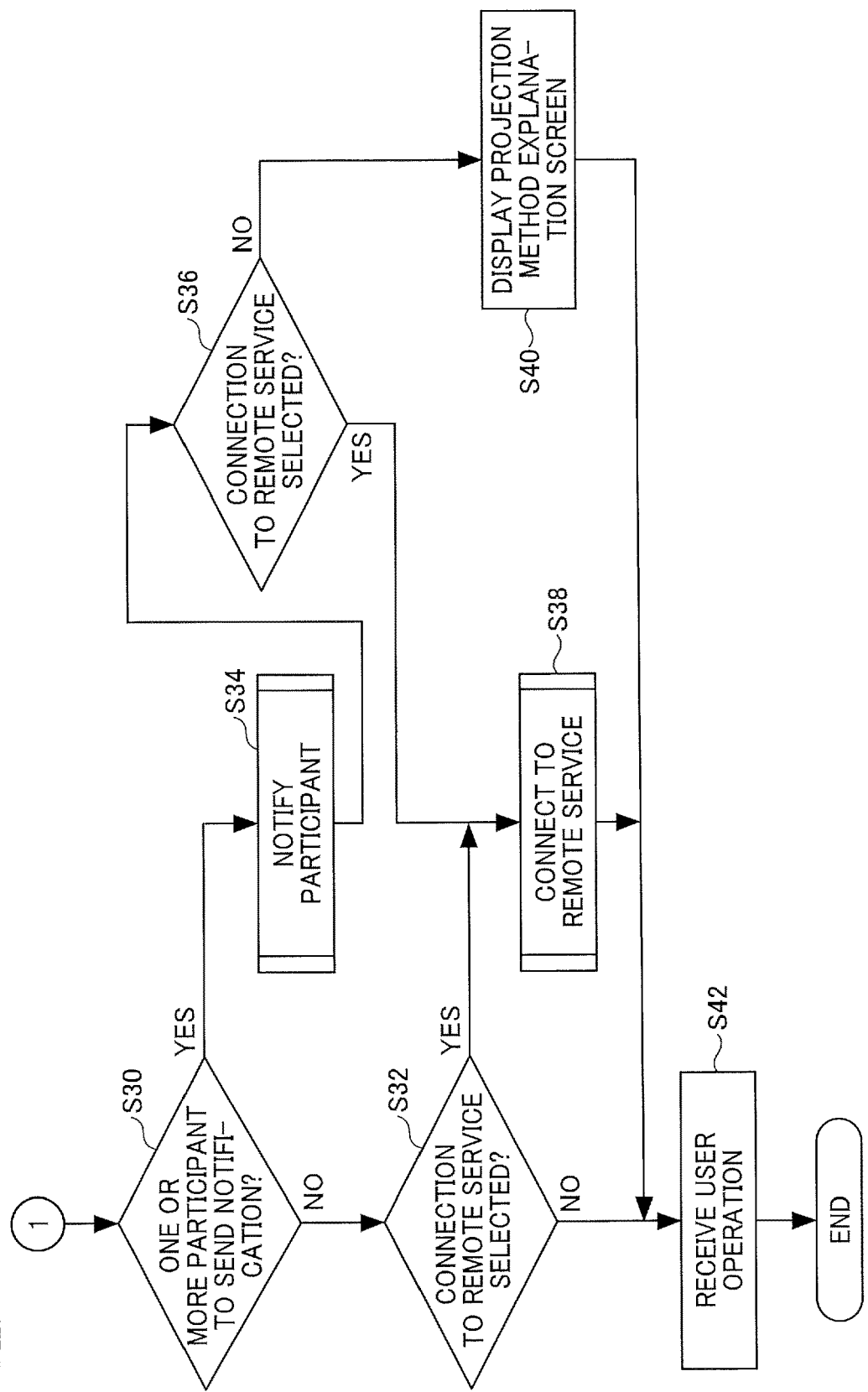

The information processing system 1 according to the present embodiment holds a remote meeting using the electronic whiteboard 14 in a procedure as illustrated in FIG. 12A and FIG. 12B, for example. FIG. 12A and FIG. 12B are a flowchart illustrating an operation of a remote meeting using the electronic whiteboard.

In step S10, when the electronic whiteboard 14 is activated, the electronic whiteboard 14 displays, for example, the operation panel 900 illustrated in FIG. 10, and waits for login by the IC card 700. The organizer of the remote meeting holds his/her IC card 700 over the IC card detection unit 48.

When the IC card detection unit 48 detects the IC card 700, the electronic whiteboard 14 identifies user information from the identification information read from the IC card 700, authenticates, and sets the user as an organizer in step S12. In the present embodiment, the user who has performed authentication first is set as the organizer of the remote meeting. The authentication in step S12 may be ID/password authentication or face authentication.

Figure 13:
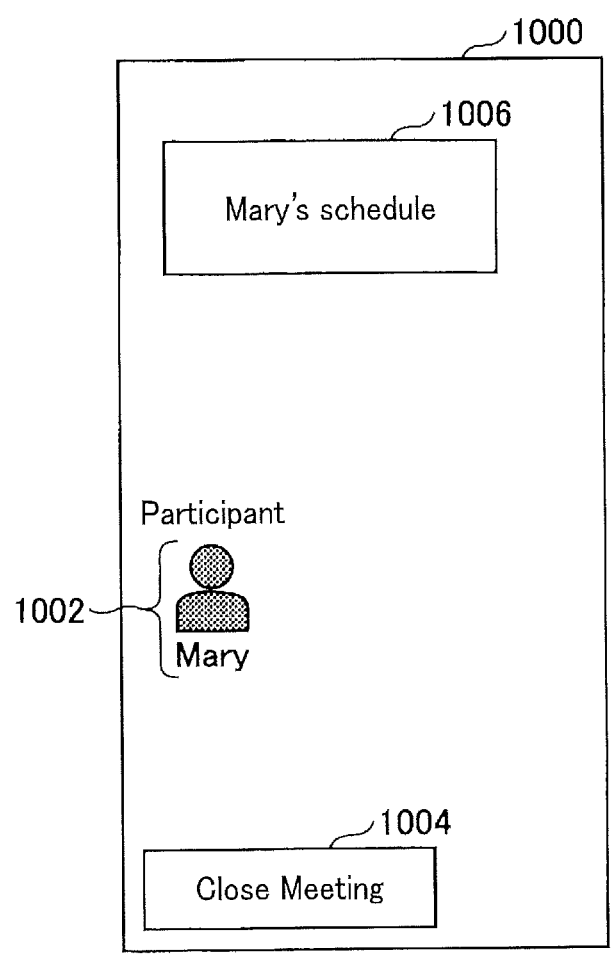
FIG. 13 is a diagram illustrating an example of a user interface (UI) displayed on the electronic whiteboard.

In step S14, the electronic whiteboard 14 displays, for example, an operation panel 1000 as illustrated in FIG. 13 as a user interface (UI). FIG. 13 is a diagram illustrating an example of a UI displayed on the electronic whiteboard 14. The operation panel 1000 of FIG. 13 displays a participant list 1002, a meeting close button 1004, and a schedule selection button 1006. In the operation panel 1000 of FIG. 13 displayed in step S14, only "Mary" as the organizer is displayed in the participant list 1002.

In step S16, the user other than the organizer also holds his/her IC card 700 over the IC card detection unit 48. When detecting the IC card 700, the electronic whiteboard 14 identifies the user information from the identification information read from the IC card 700, authenticates, and sets the user as a remote meeting participant in step S18. The electronic whiteboard 14 adds the user who has been authenticated and set as the participant of the remote meeting to the participant list 1002. For example, "Sato" and "Saito" are displayed on the operation panel 1000 as illustrated in the participant list 1002 of the operation panel 1000 in FIG. 14A.

When the schedule selection button 1006 on the operation panel 1000 is pressed, the electronic whiteboard 14 proceeds to step S20, and acquires schedule information of the organizer "Mary" from the schedule service 32. The operation panel 1000 is continuously displayed even after the schedule selection button 1006 is pressed.

Figure 14A:
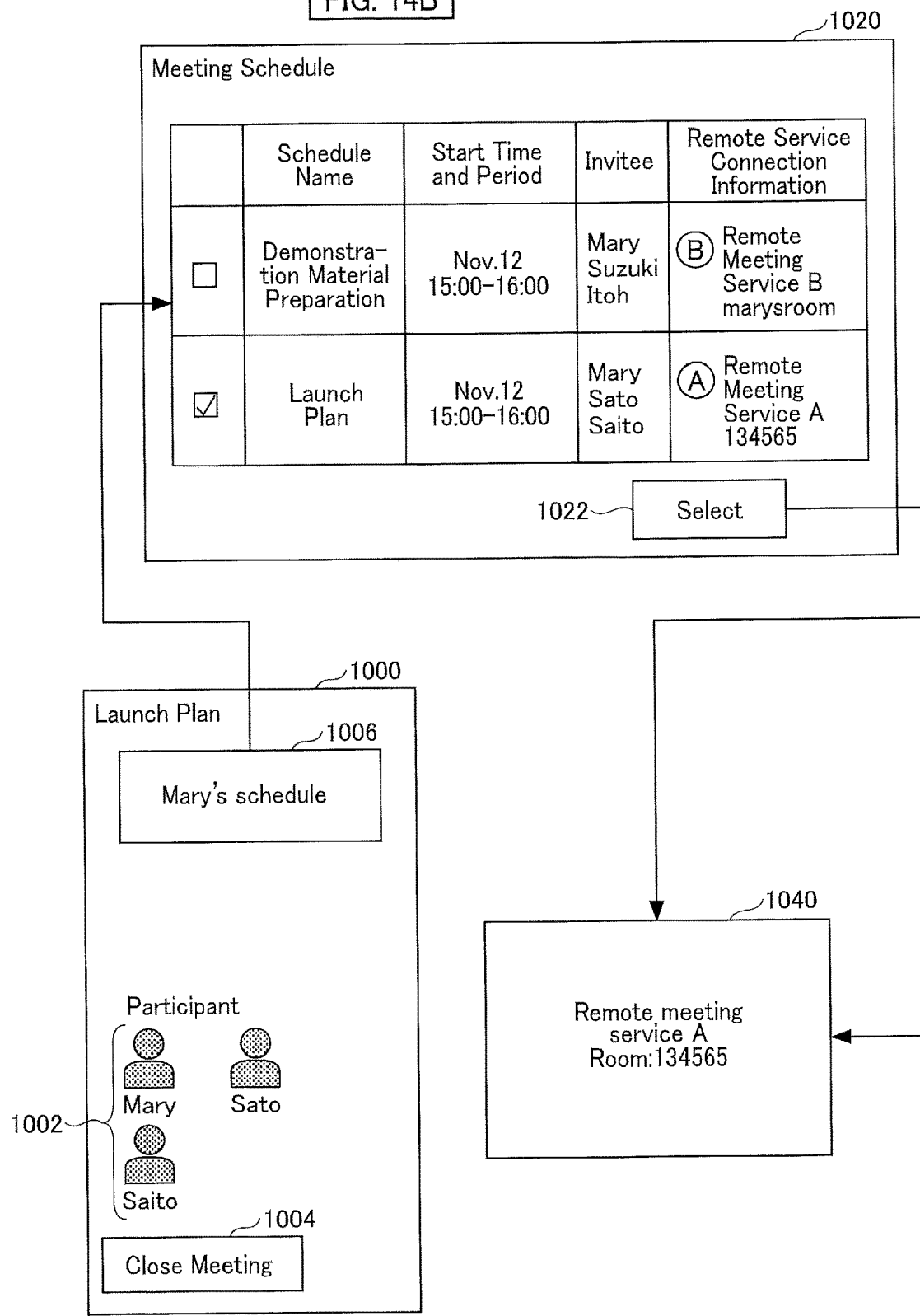
FIG. 14A and FIG. 14B are diagrams illustrating an example of the UI displayed on the electronic whiteboard.

In step S22, the electronic whiteboard 14 displays the schedule selection screen 1020 of FIG. 14A based on the schedule information of the organizer "Mary" acquired in step S20 and accepts selection of the meeting schedule. The electronic whiteboard 14 continues to display the operation panel 1000 illustrated in FIG. 14A together with the schedule selection screen 1020 illustrated in FIG. 14A.

The schedule selection screen 1020 illustrated FIG. 14A illustrates an example in which schedule information of the schedule IDs "sch-1" and "sch-2" is displayed. On the schedule selection screen 1020, schedule name, start time and period, invitee, remote meeting service icon, remote meeting service name, connection destination, and a check box to select the meeting schedule are displayed to confirm the contents of the selected meeting schedule. By pressing the select button 1022 with the check box checked, the organizer can select a meeting schedule. Proceeding to step S24, the electronic whiteboard 14 reads schedule information of the meeting schedule selected by the organizer.

In step S26, the electronic whiteboard 14 adds, to the participant management information list, users who are not included in the participant management information list of FIG. 9 among the invitees included in the read schedule information.

Figure 14B:
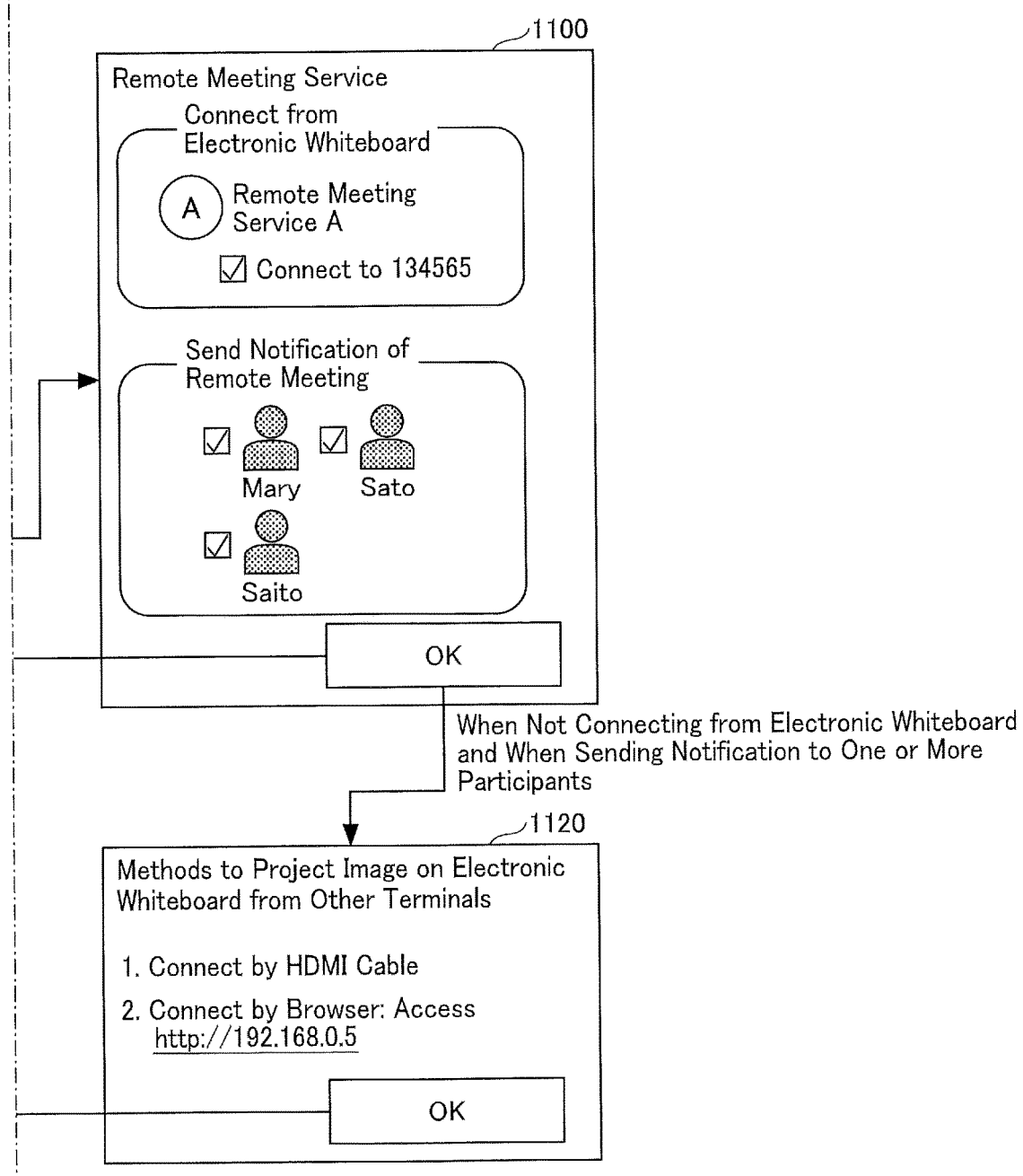

In step S28, the electronic whiteboard 14 displays the remote service connection confirmation screen 1100 illustrated in FIG. 14B based on the read schedule information. The remote service connection confirmation screen 1100 in FIG. 14B illustrates an example in which the meeting schedule with the schedule ID "sch-2" is selected. The remote service connection confirmation screen 1100 includes a check box for designating whether to connect to the remote meeting from the electronic whiteboard 14, a participant list included in the participant management information list, a check box for designating a notification target of the remote meeting to be started from the participant list.

Note that there may be a user whose notification key illustrated in FIG. 7 is not set. The participant management unit 44 queries the user information server 10 whether a notification key is set for each user included in the participant list, and depending on the result of the inquiry, the remote service connection confirmation screen 1100 in which only the check box corresponding to the participant for which the notification key is set may be displayed. Also, based on the result of the inquiry to the user information server 10, a remote service connection confirmation screen 1100 indicating participants who can be notified of the remote meeting among the meeting participants may be displayed, for example, by graying out or not displaying the check box of the participant for which the notification key is not set, or not displaying the participant whose notification key is not set in the designated field of the participant to be notified of the remote meeting and the like.

When the OK button is pressed with one or more notification targets (notification destinations) designated (YES in step S30), the electronic whiteboard 14 notifies the participant in step S34, and the process proceeds to step S36. The electronic whiteboard 14 determines whether or not to connect to the remote meeting in step S36. When a check box for designating whether to connect to the remote meeting from the electronic whiteboard 14 is checked (YES in step S36), the electronic whiteboard 14 connects to the remote meeting service in step S38.

In step S34, a notification including the remote service connection destination information of the remote meeting to be held is sent to the notification destination of the user designated as the notification target. In step S38, the electronic whiteboard 14 is connected to the remote meeting service based on the selected remote service connection destination information for the meeting to be held.

When the OK button is pressed with the notification target not designated (NO in step S30) and a check box for designating whether or not to connect to the remote meeting from the electronic whiteboard 14 checked (YES in step S32), the electronic whiteboard 14 connects to the remote meeting service in step S38. When the OK button is pressed with the notification target not designated (NO in step S30) and a check box for designating whether or not to connect to the remote meeting from the electronic whiteboard 14 not checked (NO in step S32), the process proceeds to step S42.

When the OK button is pressed with one or more notification targets designated (YES in step S30), the electronic whiteboard 14 notifies the participant in step S34, and the process proceeds to step S36. When the check box for designating whether to connect to the remote meeting from the electronic whiteboard 14 is not checked (NO in step S36), the electronic whiteboard 14 displays a projection method explanation screen 1120 in step S40.

In step S40, the projection method explanation screen 1120 illustrated in FIG. 14B including an explanation of a method of projecting the screen of a personal terminal on the electronic whiteboard 14 is displayed when the electronic whiteboard 14 does not connect to the remote meeting and when the personal terminal such as the PC 15 or the mobile terminal 16 of the user to be notified connects to the remote meeting service.

The projection method explanation screen 1120 illustrated in FIG. 14B describes two examples of the method of projecting the screen of the personal terminal on the electronic whiteboard 14, which are a method of directly connecting with a cable and a method of connecting from a web browser. The method of displaying the screen of the personal terminal on the electronic whiteboard 14 is not limited to the example of the projection method explanation screen 1120 illustrated in FIG. 14B.

In step S42, the electronic whiteboard 14 performing the remote meeting displays the remote meeting screen 1040 and accepts a user operation such as writing on the electronic whiteboard 14. The PC 15 or the mobile terminal 16 of the user to be notified can connect to the remote meeting service using the remote service connection destination information included in the notification and participate in the remote meeting. Devices participating in the same remote meeting remotely share the content of the display on the remote meeting screen 1040.

Figure 15:
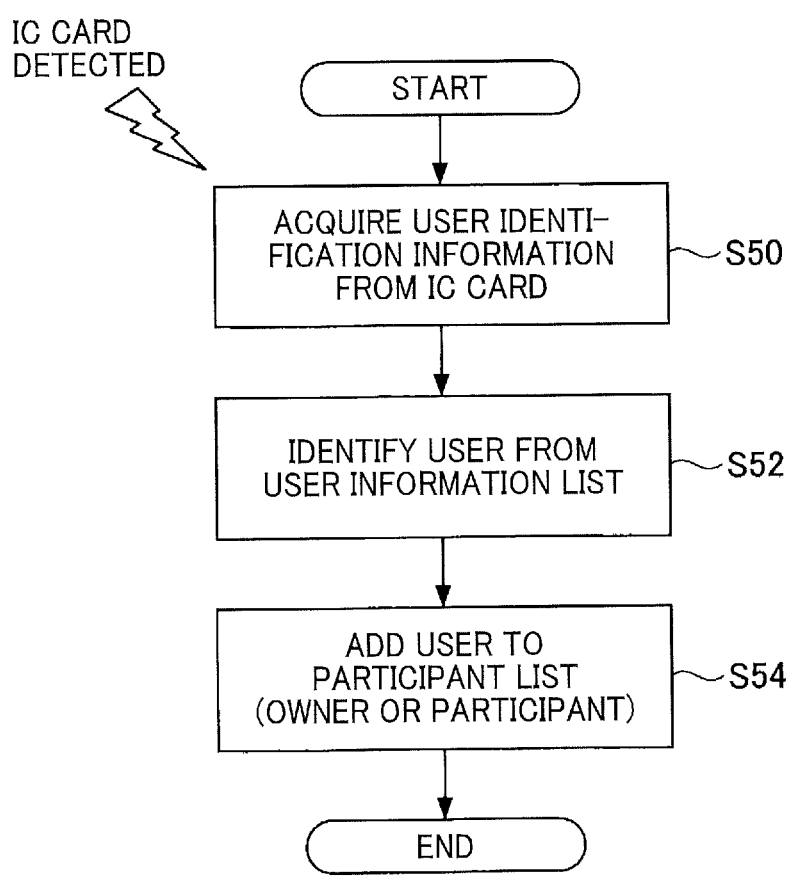
FIG. 15 is a flowchart illustrating an example of a process for authenticating and setting a meeting organizer.

In step S12 of FIG. 12A, for example, the organizer is authenticated and set by the process illustrated in FIG. 15. FIG. 15 is a flowchart illustrating an example of a process for authenticating and setting a meeting organizer. FIG. 15 illustrates a process after the IC card detection unit 48 of the electronic whiteboard 14 detects the IC card 700 and reads identification information from the IC card 700.

In step S50, the participant management unit 44 acquires the identification information read from the IC card 700 by the IC card detection unit 48. In step S52, the participant management unit 44 refers to the user information list illustrated in FIG. 7 and identifies the user holding the identification information acquired in step S50 from the user information list illustrated in FIG. 7. In step S54, the participant management unit 44 sets the identified user as an organizer and adds the user to the participant list 1002.

For example, the IC card detection unit 48 that has detected the IC card 700 of "Mary Smith" illustrated in the user information list in FIG. 7 reads the identification information "ICCARD-123" from the IC card 700. In step S50, the participant management unit 44 acquires the identification information "ICCARD-123" from the IC card detection unit 48. In step S52, the participant management unit 44 queries the external service settings information unit 20 and the user information unit 22 of the user information server 10 based on the acquired identification information "ICCARD-123".

The user information unit 22 searches the inquired identification information "ICCARD-123", identifies the user information including the user ID "user001", and returns the user information to the participant management unit 44 of the electronic whiteboard 14. Further, the external service settings information unit 20 searches the identified user ID "user001", identifies the external service settings information "connect1a" illustrated in FIG. 8 and returns the external service settings information to the participant management unit 44 of the electronic whiteboard 14.

In step S54, the participant management unit 44 sets the user with the user ID "user001" as the organizer and adds the user to the participant list 1002, and also stores the external service settings information "connect1a" of the user with the user ID "user001". As a result, "Mary Smith" is registered as the organizer of the remote meeting in the participant management unit 44, and the participant management information list illustrated in FIG. 9, the user information of the user ID "user001" illustrated in FIG. 7, and the external service settings information of the external service setting ID "connect1a" illustrated in FIG. 8 are acquired.

Figure 16:
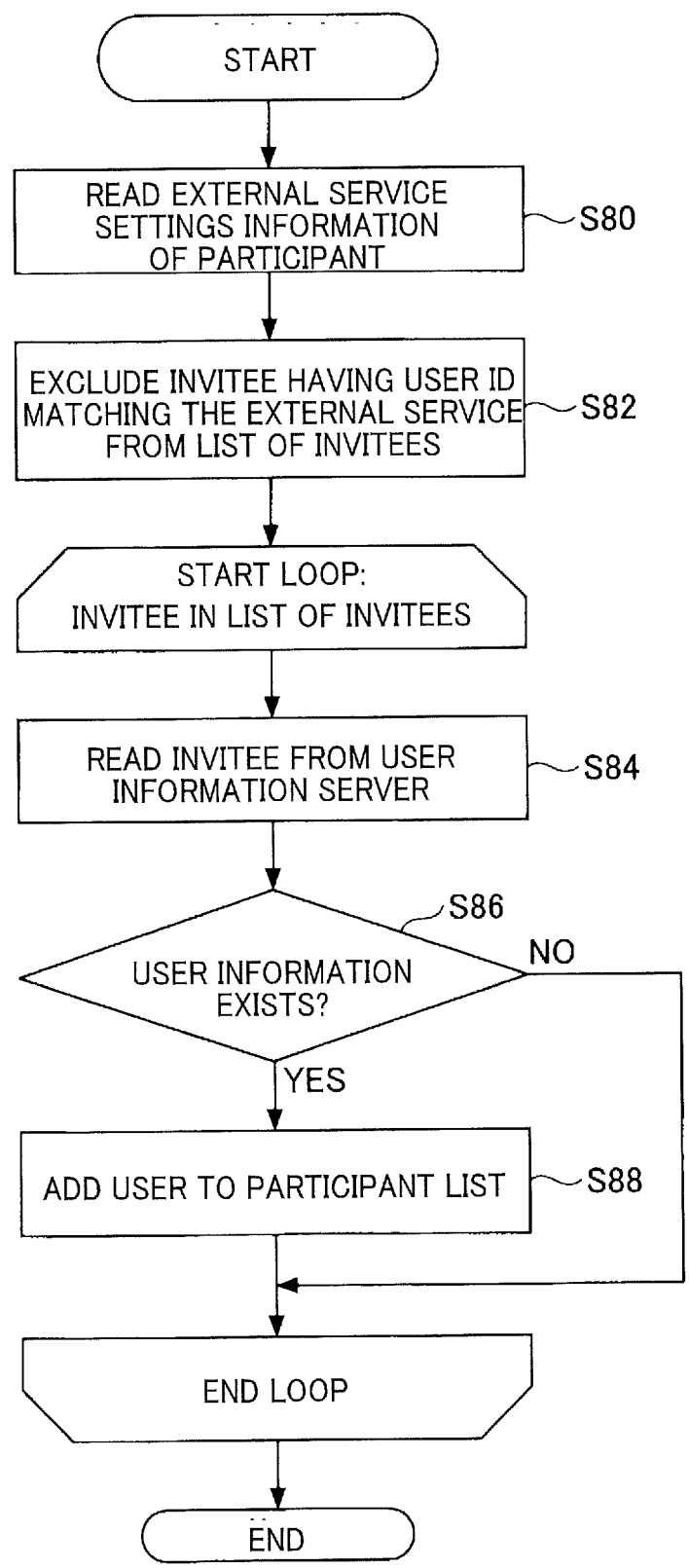
FIG. 16 is a flowchart illustrating an example of a process for adding an invitee of a selected meeting to a participant management information list.

In step S26 of FIG. 12, the invitee of the selected meeting is added to the participant management information list by, for example, the process illustrated in FIG. 16. FIG. 16 is a flowchart of an example of a process for adding an invitee of the selected meeting to the participant management information list.

In step S80, the participant management unit 44 queries the external service settings information unit 20 for the external service settings information of the current participant. In step S82, the participant management unit 44 excludes the participant that matches the user ID of the external service from the invitee included in the schedule information of the organizer.

The processes of steps S84 to S88 are performed on all the invitees who have not been excluded from the invitees in step S82. In step S84, the participant management unit 44 queries the user information unit 22 for user information corresponding to the user ID of the scheduled participant for the external service.

When user information corresponding to the user ID of the external service exists, the participant management unit 44 adds the user ID of the invitee to the participant management information list of FIG. 9 in step S88. When user information corresponding to the user ID of the external service does not exist, the participant management unit 44 skips step S88.

When the select button 1022 of the schedule selection screen 1020 illustrated in FIG. 14A is pressed, the participant management unit 44 queries the external service settings information unit 20 for the external service settings information "connect1a" of the current participant (organizer) in step S80.

In step S82, the participant management unit 44 excludes "office1" which is the user ID of the external service of the organizer from the invitees included in the schedule information of the organizer "user001".

In step S84, the participant management unit 44 queries the user information server 10 for user information corresponding to the user IDs of the external service "office2" and "office3" of the remaining invitee.

Since the user information server 10 has the user IDs "user002" and "user003" corresponding to the user IDs "office2" and "office3" of the external service, the user IDs "user002" and "user003" are returned to the participant management unit 44. In step S88, the participant management unit 44 adds the user IDs "user002" and "user003" to the participant management information list.

In the present embodiment, the schedule information registered in the schedule service 32 of the organizer can be set and read as the meeting schedule of the electronic whiteboard 14. As a result, a participant who has not been authenticated by the IC card 700, or a participant without the IC card 700 may participate in the meeting with ease.

Figure 17:
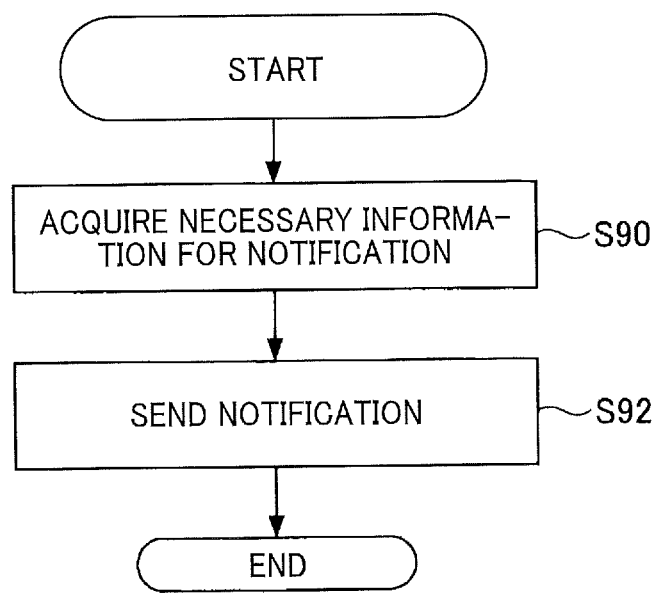
FIG. 17 is a flowchart illustrating an example of a process of notifying a participant.

In step S34 in FIG. 12, notification is made to the participant in the process illustrated in FIG. 17, for example. FIG. 17 is a flowchart illustrating an example of a process of notifying a participant.

In step S90, the participant management unit 44 of the electronic whiteboard 14 acquires information necessary for sending notification including the remote service connection destination information of the remote meeting to be held, to the user designated as the notification target. Specifically, a mail address required for notification by e-mail and a notification key required for push communication of the web browser are acquired from the user information list in FIG. 7.

In step S92, when the notification transmission server 18 is a mail server, the participant management unit 44 provides the notification transmission server 18 with a mail address of the user designated as the notification target, and a sender's mail address, a subject, and a body text of e-mail to be sent, and the notification is sent by the e-mail as illustrated in FIG. 19.

FIG. 19 is a diagram illustrating an example of a notification mail. In the notification mail of FIG. 19, a method of connecting to the remote meeting service including the remote service connection destination information and a method of projecting the screen of the personal terminal to the electronic whiteboard 14 are indicated. Although FIG. 19 illustrates an example in which a connection is made from a web browser as an example of a connection method to the remote meeting service, a connection method from an application other than the web browser may be indicated.

When the notification transmission server 18 is a push communication server, the participant management unit 44 provides the notification key of the user designated as the notification target, a title of notification to the user, and body text of notification to the notification transmission server 18, and sends the notification by push communication of the web browser as illustrated in FIG. 20 including the remote service connection destination information of the remote meeting to be held.

FIG. 20 is a diagram illustrating an example of the notification pushed to a browser. In the push notification by the browser illustrated in FIG. 20, a method for connecting to the remote meeting service including the remote service connection destination information and a method for projecting the screen of the personal terminal to the electronic whiteboard 14 are indicated similar to the contents of the notification mail in FIG. 19.

The user who receives the notification including the remote service connection destination information of the remote meeting to be held by the e-mail in FIG. 19 or by the push notification by browser in FIG. 20 can connect to the remote meeting service and participate in the remote meeting from a personal terminal such as the PC 15 or the mobile terminal 16 using the remote service connection destination information included in the notification.

Figure 18:
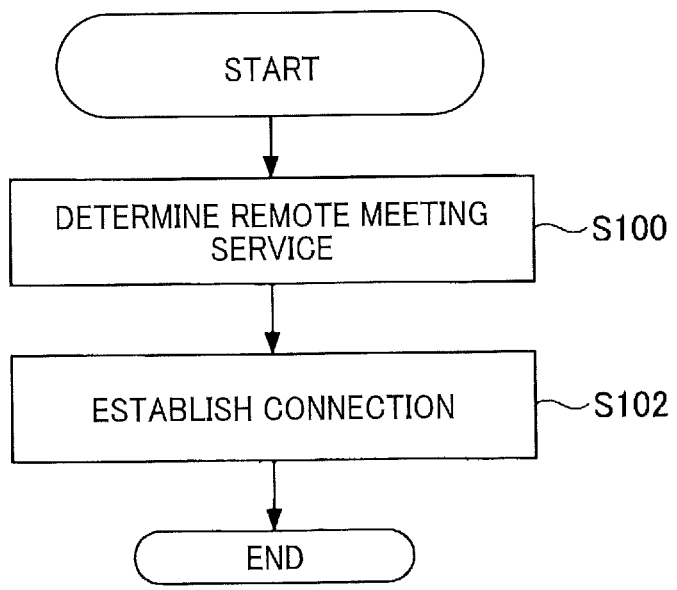
FIG. 18 is a flowchart illustrating an example of a process for connecting to a remote meeting service.

The process of connecting to the remote meeting service in step S38 in FIG. 12B is performed, for example, according to a process illustrated in FIG. 18. FIG. 18 is a flowchart illustrating an example of the process for connecting to a remote meeting service.

In step S100, when connecting to the remote meeting service, the meeting schedule setting unit 40 determines the remote meeting service by using a domain portion or the like included in the remote service connection destination information.

In step S102, the meeting schedule setting unit 40 determines and activates the remote service client 42 according to the remote meeting service. If the remote meeting service determined in step S100 is not supported, the meeting schedule setting unit 40 does not activate the remote service client 42. When the determined remote meeting service is not supported, security is improved by not activating the remote service client 42. The method of notifying the remote service client 42 to be started of the connection destination of the remote meeting differs for each remote service client 42.

In the case of the remote service client 42 that can connect to the remote meeting service using the dedicated application "remoteservicea.exe", the remote service client 42 can be notified of the connection destination by, for example, starting the connection destination "134565" as an argument.

In the case of the remote service client 42 that can connect to the remote meeting service using a web browser, the remote service client 42 can be notified of the connection destination by inputting the remote service connection destination information as a URL into the web browser.

Note that the argument and URL for notifying the remote service client 42 to be activated of the remote meeting connection destination may use the remote service connection destination information, may extract a part of the remote service connection destination, or may rewrite the remote service connection destination information. For example, the description of "https://" in the URL may be rewritten and used according to the data structure (schema) that can be handled by the remote management service.

In addition, if the remote service connection destination information uses a custom URL scheme, the meeting schedule setting unit 40 can notify the remote service client 42 of the connection destination by determining a dedicated application to be started by the custom URL scheme and starting the application with the connection destination as an argument.

As described above, according to the present embodiment, since the remote service connection destination information of the remote meeting selected by the organizer is sent to the user designated as the notification target, connecting to the remote meeting connection destination can be facilitated for the user receiving the notification.

In the present embodiment, for example, as illustrated in the schedule selection screen 1020 of FIG. 14A, the remote meeting to be held is selected from the meeting schedule registered in the schedule information, but the remote meeting to be held may be newly created. For example, the organizer presses a "new remote meeting start button" provided on the operation panel 1000 or the like to make a request to create a new remote meeting. By displaying the remote service connection confirmation screen 1100 illustrated in FIG. 14B, the electronic whiteboard 14 can send the notification including the remote service connection destination information of the newly created remote meeting to the notification destination of the user designated as the notification target.

Further, the schedule selection screen 1020 in FIG. 14A illustrates an example in which the remote service connection destination information is set in all the schedule information, but the schedule information without the remote service connection destination information may be included. When there is no remote service connection destination information, a message indicating that the remote meeting connection destination is missing may be displayed.

When there is no remote service connection destination information, an available remote meeting service may be presented, and a usage button for displaying each of the available remote meeting service usage methods may be displayed. When the usage method button is pressed, the electronic whiteboard 14 may display a screen indicating the usage method of the remote meeting service. For example, the description of the method of using the remote meeting service includes information on how to attach the remote service connection destination information to the schedule information.

Further, the electronic whiteboard 14 may not directly display the description of the method of using the remote meeting service but may notify the scheduled participant and the participant of the electronic whiteboard 14 of the method of using the remote meeting service by e-mail.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. The information processing system 1 described in the above embodiment is just an example, and there may be various system configurations depending on applications or purposes.

Each function of the embodiment described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The apparatuses described in the examples are merely an illustration of one of several computing environments for implementing the embodiments disclosed herein.

In some embodiments, user information server 10 includes multiple computing devices, such as a server cluster. The plurality of computing devices are configured to communicate with one another through any type of communication link, including a network 19, shared memory, etc., and perform the processes disclosed herein. Similarly, the electronic whiteboard 14 may include multiple computing devices configured to communicate with one another.

Furthermore, the user information server 10 and the electronic whiteboard 14 can be configured to share the disclosed processes in various combinations. For example, a process executed by a particular unit may be executed by the electronic whiteboard 14. Similarly, the function of the particular unit can be executed by the electronic whiteboard 14. The components of the user information server 10 and the electronic whiteboard 14 may be combined into one server or may be divided into a plurality of apparatuses.

The devices connected to the connection destination of the remote meeting are not limited to the electronic whiteboard 14, the PC 15, and the mobile terminal 16, and for example, an output device such as a projector, a digital signage, a head up display device, an industrial machine, an imaging device, a sound collecting device, a medical device, a network home appliance, a car (Connected Car), a mobile phone, a game machine, a personal digital assistant (PDA), a digital camera, a wearable PC, or the like.

What is claimed is:

1. An information processing apparatus comprising: circuitry configured to:
   detect one or more users using the information processing apparatus;
   acquire notification destination information of each user, by accessing a user information server that manages the destination information of each user, the notification destination information being information indicating a destination to which notification is to be sent, the user information server being different from the information processing apparatus; and
   notify each user of remote service connection destination information required for connecting to a remote service using the notification destination information acquired from the user information server,
   wherein the circuitry is further configured to acquire detected user's schedule information including the remote service connection destination information from an external service provided by an external service system that is provided outside the information processing apparatus by accessing the external service system from the information processing apparatus by using external service settings information associated with the user for accessing the external service system,
   wherein the circuitry is further configured to:
      receive a selection of a target of the notification and an instruction to connect to the remote service that is stored in the detected user's schedule information upon receiving a selection of a schedule that uses the information processing apparatus from the detected user's schedule information,
      send the notification to a selected target and cause the selected target to be connected to the remote service upon receiving a selection of at least one target of the notification and the instruction to connect to the remote service,
      cause the selected target to be connected to the remote service without sending the notification upon receiving the instruction to connect to the remote service without receiving the selection of at least one target of the notification, and
      send the notification to the selected target and display a screen of a terminal that is used by the user of the information processing apparatus on the information processing apparatus, upon receiving the selection of at least one target of the notification without receiving the instruction to connect to the remote service.

2. The information processing apparatus of claim 1, wherein the remote service connection destination information is included in user information of the user associated with the detected user.

3. The information processing apparatus of claim 1, wherein the circuitry is further configured to accept a selection of the user to be notified of the remote service connection destination information among the detected users.

4. The information processing apparatus of claim 1, wherein the remote service connection destination information includes a URL of the connection destination of the remote service.

5. The information processing apparatus of claim 1, wherein the user's schedule information includes information indicating when the user is scheduled to have a remote meeting.

6. The information processing apparatus of claim 1, wherein the circuitry is configured to display the method of displaying the screen of the terminal operated by the user on the information processing apparatus by at least one of directly connecting the information processing apparatus and the terminal via a cable and connecting the information processing apparatus and the terminal via a web browser.

7. The information processing apparatus of claim 1, wherein the information processing apparatus includes an electronic whiteboard.

8. The information processing apparatus of claim 1, wherein the target of the notification includes a user that is authorized via an IC card.

9. An information processing system comprising an information processing apparatus shared by a plurality of users, the information processing system comprising: circuitry configured to:
   detect one or more users using the information processing apparatus;
   acquire notification destination information of each user, by accessing a user information server that manages the destination information of each user, the notification destination information being information indicating a destination to which notification is to be sent, the user information server being different from the information processing apparatus; and
   notify each user of remote service connection destination information required for connecting to a remote service using the notification destination information acquired from the user information server,
   wherein the circuitry is further configured to acquire the detected user's schedule information including the remote service connection destination information from an external service provided by an external service system that is provided outside the information processing apparatus by accessing the external service system from the information processing apparatus by using external service settings information associated with the user for accessing the external service system,
   wherein the circuitry is further configured to:
      receive a selection of a target of the notification and an instruction to connect to the remote service that is stored in the detected user's schedule information upon receiving a selection of a schedule that uses the information processing apparatus from the detected user's schedule information,
      send the notification to a selected target and cause the selected target to be connected to the remote service upon receiving a selection of at least one target of the notification and the instruction to connect to the remote service,
      cause the selected target to be connected to the remote service without sending the notification upon receiving the instruction to connect to the remote service without receiving the selection of at least one target of the notification, and
      send the notification to the selected target and display a screen of a terminal that is used by the user of the information processing apparatus on the information processing apparatus, upon receiving the selection of at least one target of the notification without receiving the instruction to connect to the remote service.

10. An information processing method executed by an information processing apparatus shared by a plurality of users, the information processing method comprising:
   detecting one or more users using the information processing apparatus;
   acquiring notification destination information of each user, by accessing a user information server that manages the destination information of each user, the notification destination information being information indicating a destination to which notification is to be sent, the user information server being different from the information processing apparatus;

notifying each user of remote service connection destination information required for connecting to a remote service using the notification destination information acquired from the user information server, and acquiring the detected user's schedule information including the remote service connection destination information from an external service provided by an external service system that is provided outside the information processing apparatus by accessing the external service system from the information processing apparatus by using external service settings information associated with the user for accessing the external service system, wherein the method further comprises:

receiving a selection of a target of the notification and an instruction to connect to the remote service that is stored in the detected user's schedule information upon receiving a selection of a schedule that uses the information processing apparatus from the detected user's schedule information, sending the notification to a selected target and causing the selected target to be connected to the remote service upon receiving a selection of at least one target of the notification and the instruction to connect to the remote service, causing the selected target to be connected to the remote service without sending the notification upon receiving the instruction to connect to the remote service without receiving the selection of at least one target of the notification, and sending the notification to the selected target and displaying a screen of a terminal that is used by the user of the information processing apparatus on the information processing apparatus, upon receiving the selection of at least one target of the notification without receiving the instruction to connect to the remote service.

\* \* \* \* \*